May 26, 1936.  G. F. YAGER ET AL  2,041,894
BROACHING MACHINE
Filed Oct. 2, 1933    2 Sheets-Sheet 2
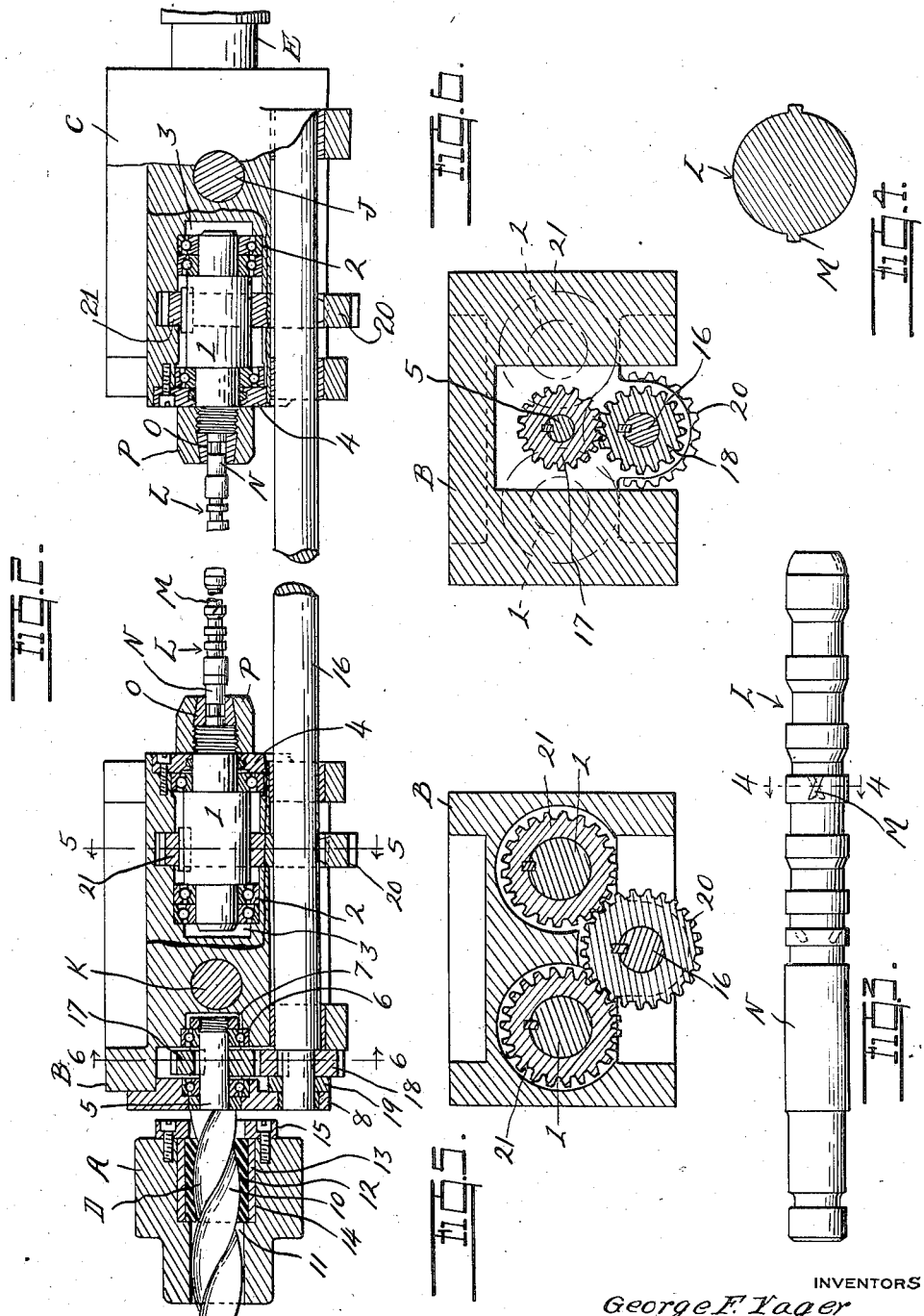
INVENTORS
George F. Yager
Oliver J. Heath
BY
ATTORNEYS Patented May 26, 1936

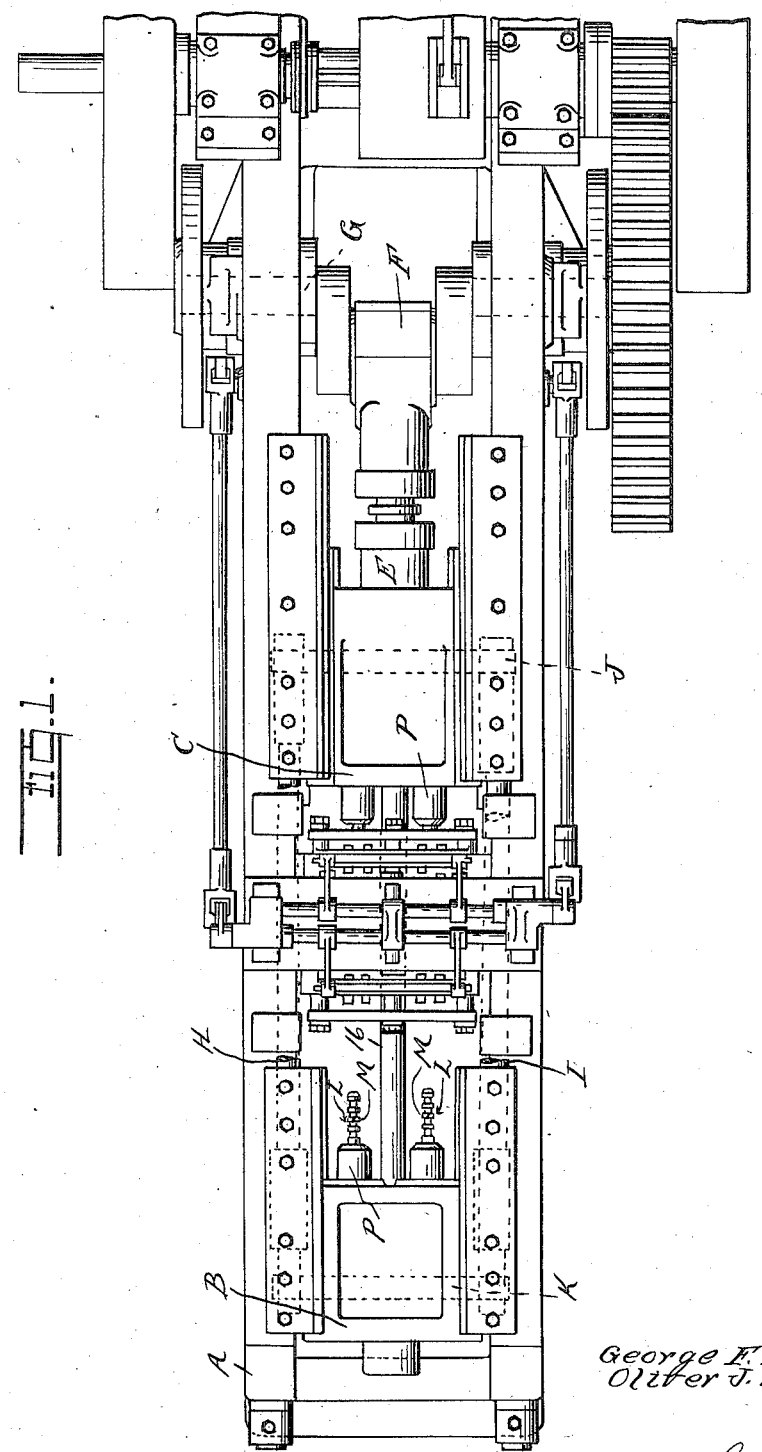

2,041,894

UNITED STATES PATENT OFFICE 2,041,894

BROACHING MACHINE

George F. Yager and Oliver J. Heath, Toledo, Ohio, assignors to The Bunting Brass and Bronze Company, Toledo, Ohio, a corporation of Ohio Application October 2, 1933, Serial No. 691,878

13 Claims. (Cl. 90—33)

This invention relates generally to broaching machines and refers more particularly to broach holding and actuating means.

One of the essential objects of the invention is to provide means of this type wherein a broach carrier is mounted for slidable movement in the frame of a broaching machine and is provided with a spiral follower.

Another object is to provide means of the type mentioned wherein provision is made for driving the slidable carrier from the main drive shaft of the machine and for driving the broach from the follower.

Another object is to provide means of the type mentioned wherein a plurality of carriers and broaches may be driven simultaneously.

Another object is to provide means of the type mentioned wherein a plurality of broaches may be carried by each carrier and may be driven from one spiral follower.

Another object is to provide means of the type mentioned wherein the pitch of the oil grooves formed by the grooving cutters of the broaches is determined by the pitch of the spiral follower and/or the ratio of gears used in the drive between said followers and broaches.

Other objects, advantages and novel details of construction of this invention will be made more apparent as this description proceeds, especially when considered in connection with the accompanying drawings wherein:

Figure 1 is a top plane view of a broaching machine embodying my invention;

Figure 2 is an enlarged fragmentary vertical sectional view through a portion of the machine;

Figure 3 is a view of one of the broaches;

Figure 4 is a sectional view taken on the line 4—4 of Figure 3;

Figure 5 is a sectional view taken on the line 5—5 of Figure 2;

Figure 6 is a sectional view taken on the line 6—6 of Figure 2.

Referring now to the drawings, A is the frame of a broaching machine similar to that illustrated in our application, Serial No. 502,526; B and C, respectively, are broach carriers spaced apart longitudinally of and mounted for slidable movement in the frame A; and D is a spiral follower for said carriers. As shown, a connecting rod E is terminally connected to the carrier C and to the crank F of a drive shaft G, while tie rods H and I, respectively, are terminally connected to cross rods J and K, respectively, in the carriers B and C.

Thus the carriers B and C will slide in unison in the frame A upon movement of the drive shaft G.

Any suitable means may be employed to drive the shaft G. (Preferably the same means as that illustrated in our application, Serial No. 502,526 is utilized.)

In the present instance the broaches L are provided with diagonally disposed cutters M for forming oil grooves in tubular or circular objects such as bearings or bushings and have shanks N held by the jaws O of suitable collets P threadedly engaging the projecting ends of rotary shafts I in the carriers. As shown, the shafts I are journaled in bearings 2 in sockets 3 at the inner ends of the carriers and are held against displacement by the end plates 4.

The spiral follower D is rotatable in but movable with the carrier B. Preferably this follower D has a reduced shank 5 journaled in bearings 6 in a socket 7 at the outer end of the carrier B and is held against displacement by the end plate 8. The spiral portion 10 of the follower is movable longitudinally in a suitable bore 11 in the frame A and engages a babbitt lining 12 for a steel guide 13 anchored in the frame. As shown, this babbitt lined guide 13 is received in an enlargement 14 of the bore 11 at the inner end thereof and is held against displacement by the end plate 15.

Preferably the broaches L carried by both carriers B and C are driven from the spiral follower D. As shown, this is accomplished by the provision of a shaft 16 journaled in bearings in the carriers B and C, a gear 17 rigid with the shank 5 of the follower, a gear 18 rigid with the shaft 16 beside a spacing collar 19 and meshing with the gear 17, gears 20 rigid with the shaft 16 adjacent the inner ends of the carriers B and C, and gears 21 rigid with the shafts I and meshing with the gears 20.

In use, when the carriers B and C are moved by the drive shaft G, the spiral portion 10 of the follower D carried by the carrier B will engage the lining 12 of the guide 13. As a result the follower D will turn the gear 17 and cause the gear 18, shaft 16, gears 20 and 21, shafts 1 and broaches L to turn. In this connection it will be observed that the turning movement of the broaches L takes place as and when the carriers B and C are moved by the drive shaft. Moreover, the extent of such turning movement governs the pitch of the oil grooves formed in the work by the cutters M of the broaches L and will be controlled by the pitch of the spiral portion 10 and/or the form of gears 17 and 18 used. For example, different followers may be substituted for or used instead of the particular follower D shown, and different gears may be used in place of the gears 17 and 18. A follower having a high pitch will produce a greater turning movement, while a follower having a small pitch will produce less turning movement. Likewise gears having different ratio will cause more or less turning movement according to the type used. The plates 8 and 15 are readily removable, hence changes and substitutions may be easily and quickly made as desired.

What we claim as our invention is:

1. In a broaching machine, a pair of spaced longitudinally movable crossheads, opposed pairs of rotatable broaches carried by said crossheads, a single spiral follower for the opposed pairs of broaches, and a common drive for said opposed pairs of broaches actuable by said spiral follower, including rotatable means spanning the space between the spaced crossheads.

2. In a broaching machine, a pair of spaced longitudinally movable crossheads, rotatable broaches carried by said crossheads and disposed in opposed relation to each other, a single spiral follower beyond one of said crossheads, and means operable by the single follower for driving the broaches carried by both crossheads.

3. In a broaching machine, a frame, a pair of spaced crossheads movable in unison on the frame, a relatively long shaft extending between and journaled in the spaced crossheads, stub shafts journaled in said crossheads, the stub shafts in one crosshead being entirely free of the other crosshead and disposed in opposed relation to the stub shafts journaled therein, broaches carried by said stub shafts and engageable with work between the crossheads, a single spiral follower beyond one of said crossheads, and a common drive for the broaches carried by both crossheads including means operable by the follower for rotating said long shaft, and means in each crosshead for rotating the stub shafts journaled therein from said long shaft.

4. In a broaching machine, a frame, spaced longitudinally movable broach carriers movable in unison on the frame, rotatable broaches carried by the opposed ends of said carriers for successive engagement with work between the carriers, a spiral follower for one of said carriers, and means operable by said spiral follower during longitudinal movement of the carriers for rotating the broaches, including a rotatable shaft extending between and journaled in said carriers, a driving connection between said follower and shaft, and driving connections between said shaft and broaches carried respectively by said carriers at longitudinally spaced points of said shaft.

5. In a broaching machine, a pair of spaced longitudinally movable crossheads, a relatively long shaft extending between and journaled in the spaced crossheads, stub shafts extending longitudinally of and journaled in said crossheads, the stub shafts in one crosshead being entirely free of the other crosshead, broaches carried by said stub shafts and engageable with work between the crossheads, a single spiral follower beyond one of said crossheads, and a common drive for the broaches carried by both crossheads including means operable by the follower for rotating said long shaft, and means in each crosshead for rotating the stub shafts journaled therein from said long shaft.

6. In a broaching machine, a pair of spaced longitudinally movable broach carriers, rotatable broaches carried by the opposed ends of said carriers for successive engagement with work between the carriers, a spiral follower for one of said carriers, and means operable by said spiral follower during longitudinal movement of the carriers for rotating the broaches, including a rotatable shaft extending between and journaled in said carriers, a driving connection between said follower and shaft, and driving connections between said shaft and broaches carried respectively by said carriers at longitudinally spaced points of said shaft.

7. In a broaching machine, a pair of spaced longitudinally movable crossheads, broaches between and carried by said crossheads, a single spiral follower beyond one of said crossheads, and a common drive for said broaches including means carried by said crossheads and actuable by said spiral follower.

8. In a broaching machine, a pair of spaced longitudinally movable crossheads, opposed pairs of broaches carried by said crossheads, a single spiral follower for the opposed pairs of broaches, and means carried by said crossheads and operable by said spiral follower for rotating all of said broaches at substantially uniform speed.

9. In a broaching machine, a longitudinally movable crosshead, a plurality of rotatable broaches projecting endwise from said crosshead at one end thereof, a spiral follower for said crosshead at the other end thereof, and means operable by said follower during longitudinal movement of said crosshead for driving said broaches including a rotatable shaft extending longitudinally of said crosshead in a plane substantially parallel to said follower, means carried by said crosshead for driving said shaft from said follower, and means carried by said crosshead for driving said broaches from said shaft.

10. In a broaching machine, a pair of spaced longitudinally movable crossheads, opposed broaches carried by said crossheads, a single spiral follower for one of said crossheads, and means operable by the single follower for actuating the broaches carried by both crossheads.

11. In a broaching machine, a pair of spaced longitudinally movable crossheads, broaches between and carried by said crossheads, a single spiral follower beyond one of said crossheads, and means operable by the single follower for actuating the broaches carried by both crossheads.

12. In a broaching machine, a pair of spaced longitudinally movable crossheads, a connection between said crossheads causing them to move in unison, broaches between and carried by said crossheads, a spiral follower beyond one of said crossheads, a driving member operatively connected to said follower and spanning the space between said crossheads, and means carried by said crossheads for actuating said broaches from said driving member.

13. In a broaching machine, a pair of spaced longitudinally movable crossheads, pairs of broaches between and carried by said crossheads, a spiral follower beyond one of said crossheads, a driving member operatively connected to said follower and spanning the space between said crossheads, and means carried by said crossheads for actuating the pairs of broaches from said driving member.

GEORGE F. YAGER.
OLIVER J. HEATH.